Sept. 23, 1924.
E. HOWARD ET AL
1,509,403
HARVESTER
Filed Feb. 20, 1922
3 Sheets-Sheet 2
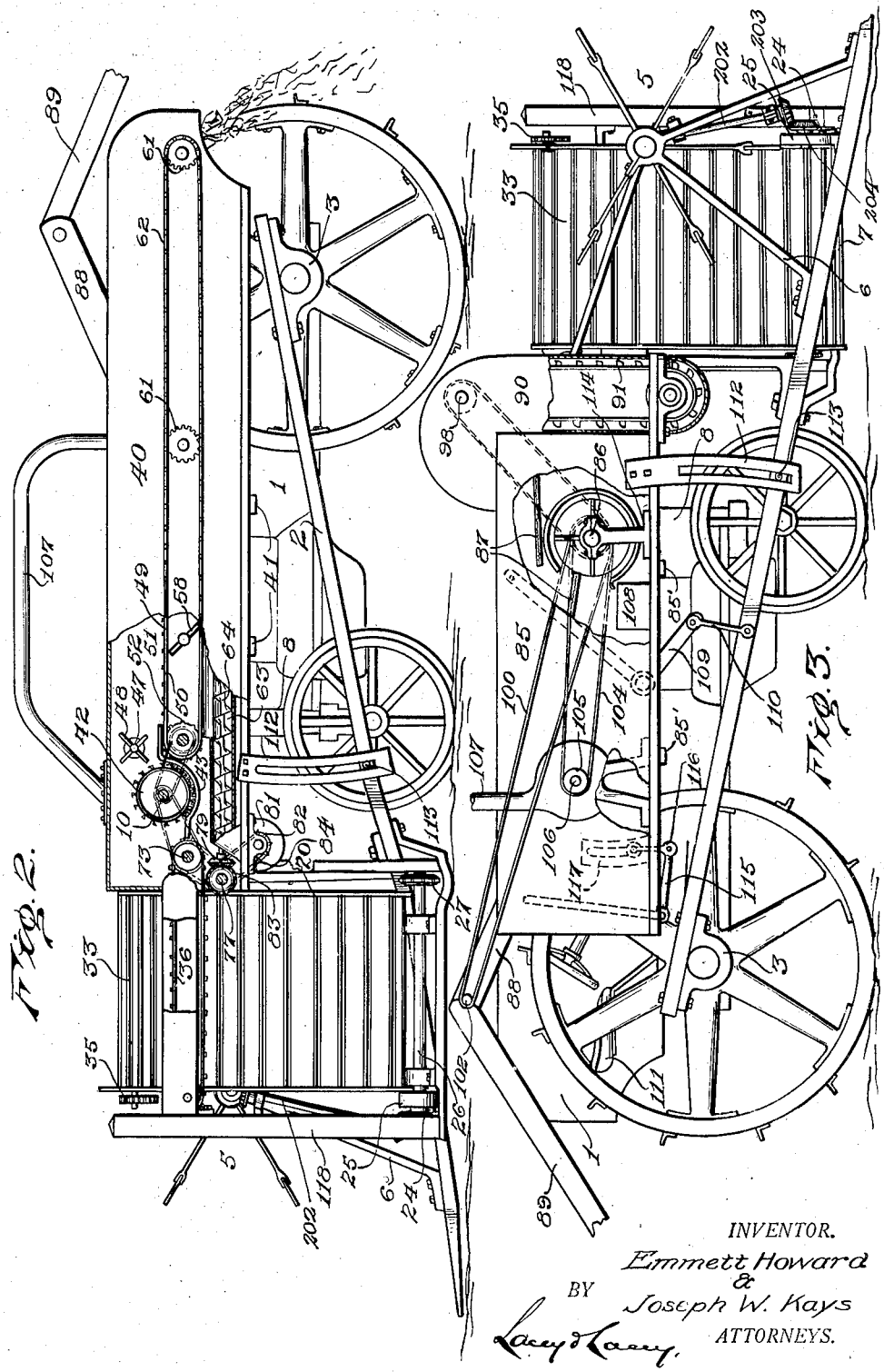
INVENTOR.
Emmett Howard
&
BY Joseph W. Kays
ATTORNEYS.

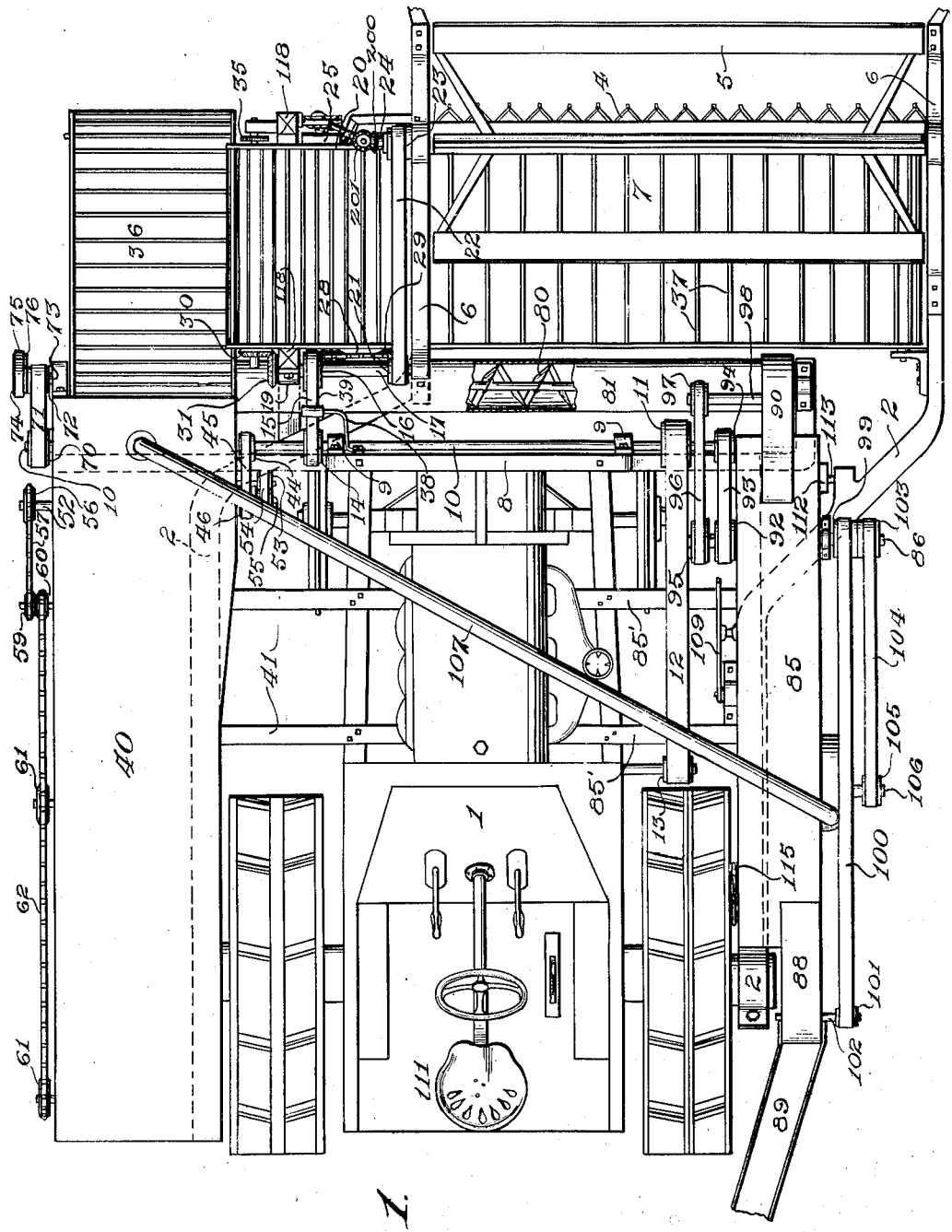

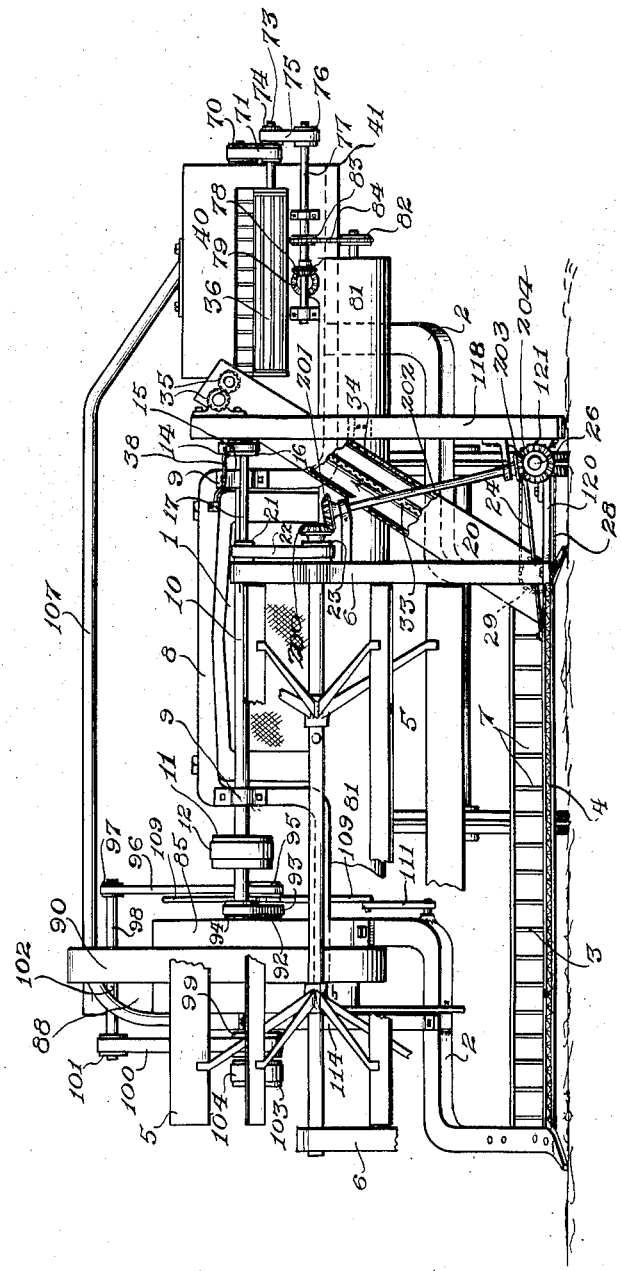

Patented Sept. 23, 1924.

1,509,403

UNITED STATES PATENT OFFICE.

EMMETT HOWARD AND JOSEPH W. KAYS, OF EUGENE, OREGON.

HARVESTER.

Application filed February 20, 1922. Serial No. 537,970.

*To all whom it may concern:*

Be it known that we, EMMETT HOWARD and JOSEPH W. KAYS, citizens of the United States, residing at Eugene, in the county of Lane and State of Oregon, have invented certain new and useful Improvements in Harvesters, of which the following is a specification.

This invention relates to harvesting mechanism and has for one object the provision of means whereby a tractor may be utilized as the driving and carrying agent for apparatus by which grain may be cut, threshed and cleaned. The invention seeks to provide an apparatus which may be readily supported by and on a tractor and in which all the working parts may be driven from a single shaft mounted upon the front end of the tractor frame and actuated by the band pulley ordinarily provided on the side of tractors and driven by the engine of the same.

The invention is illustrated in the accompanying drawings, in which—

Figure 1 is a plan view of one embodiment of the invention;

Figs. 2 and 3 are side elevations, partly broken away, of the apparatus viewed from the opposite sides;

Fig. 4 is a front elevation, partly broken away.

The tractor 1 may be of any preferred type and is illustrated in a more or less conventional manner. In carrying out our invention, the hubs of the tractor driving wheels are extended beyond the wheels and a frame 2 is mounted by boxes 3 upon the said extended hubs so that said frame will be pivotally supported. The frame 2 extends downwardly and forwardly from the rear driving wheels and at its front end carries a cutter 4 and a reel 5, the reel being journaled in standards 6 rising from the forward portions of the frame 2 and serving to hold the grain to the cutter and beat it rearwardly and downwardly so that it will fall upon the conveyor 7. Upon the frame of the tractor, and across the radiator, we secure a cross beam or frame 8 carrying bearings 9 to receive and support the main driving shaft 10 which projects laterally beyond the opposite sides of the tractor and is equipped near one end with a pulley 11 connected by a belt 12 with the band pulley 13 now provided upon most farm tractors. A clearly shown in Figs. 1 and 4, the pulleys 11 and 13 and the belt 12 are arranged at the right side of the tractor, which is the grainward side of the apparatus. Immediately adjacent the left side of the tractor, a pulley 14 is secured upon the shaft 10 and this pulley has trained around it a belt 15 which is also trained around a pulley 16 on a transmission shaft 17 which is journaled at one end upon an extension of the frame 2 or the adjacent standard 6 and at its opposite end is journaled in a bearing bracket 19 on the rear side of an elevator frame 20, said frame being carried by uprights 118 carried by the frame 2. A pulley 21 is secured upon the shaft 17 and a belt 22 is trained around the said pulley and around a pulley 23 on the shaft of the reel 5 so as to drive the said reel. The cutter 4 is of the usual reciprocating blade type and is operated by a pitman 24 connecting the inner end of the knife with a crank disc 25 secured on the front end of a pitman shaft 26 which is journaled in suitable bearings upon the frame 2 below the elevator 20. The rear end of the shaft 26 carries a sprocket 27 and a chain 28 is trained around the said sprocket and around a similar sprocket 29 upon the rear end of a shaft which is journaled in and extends through the lower end of the frame of the elevator 20 and carries the drum supporting the lower bight of the lower belt or apron of the elevator. The elevator comprises two endless belts or aprons of the usual construction and the lower belt or apron 34 is driven from the upper belt 33 by intermeshing pinions 35 secured on the front ends of the shafts carrying the upper drums or rollers, as will be readily understood on reference to Fig. 4. This arrangement of gearing causes the inner opposed runs of the two belts or aprons to move upwardly, as indicated by the arrow in Fig. 4, so that the grain deposited on the conveyor 7 will be carried upwardly between the two belts or aprons of the elevator and delivered onto the conveyor 36 by which it will be transferred to the threshing cylinder. The shaft carrying the upper pinion 35 is equipped at its rear end with a beveled pinion 30 which meshes with a beveled pinion 31 on the end of the shaft 17 so that the elevator aprons are driven directly from the shaft 17. The pitman shaft, from which motion is transmitted to the cutter and the conveyor 7, receives its motion from the reel shaft. A beveled gear 200 is secured on the end of the reel shaft adjacent the pulley 23 and meshes with a similar gear 201 on the upper end of a shaft 202 which extends to a point near the pitman shaft and is equipped at its lower end with a beveled gear 203. The gear 203 meshes with a similar gear 204 on the front end of the pitman shaft. The conveyor 7 is preferably an endless belt or apron mounted in the frame 2 immediately in rear of the cutter and equipped with parallel transverse bars or slats 37 whereby the grain will be positively moved by the conveyor, and the elevator conveyors 33 and 34, as well as the thresher feeding conveyor 36, are constructed in a similar manner. The frame 2 may be adjusted pivotally about the hubs of the rear tractor wheels so that the cutter may be set at any desired height above the ground, and to maintain the tension of the belt 15 as the cutter is raised or lowered, we provide a belt tightener 38 which is pivotally mounted above the adjacent bearing 9 and carries a roller 39 bearing constantly upon the said belt.

The threshing machine 40 is mounted on the left or stubbleward side of the tractor and is supported by transverse beams 41 projecting laterally from the tractor frame. The main driving shaft 10 extends through the front end of the threshing machine and constitutes the axle of the threshing cylinder 42 which may be of any well-known construction and co-operates with the usual concaves 43 to thresh the grain from the straw. At the inner side of the threshing machine, a pulley 44 is secured upon the shaft 10 and this pulley is operatively connected by a belt 45 with a pulley 46 upon the inner end of a beater shaft 47. The said beater shaft 47 is journaled in the sides of the threshing machine casing and carries blades or beater arms 48 within the said casing to beat the straw onto a conveyor 49 disposed longitudinally within the said casing. This conveyor 49 consists of parallel endless chains 50 and cross bars or slats 51 carried by said chains, the front bight of the conveyor being carried by a drum 52 having its shaft extended through the inner side of the threshing machine casing and equipped with a pulley 53 receiving motion through a belt 54 trained around it and around a pulley 55 on the extended end of the beater shaft 47. The outer end of the shaft or drum 52 is extended through the outer side of the threshing machine casing and is equipped with a sprocket 56, around which is trained a chain 57. Between the upper and lower runs of the conveyor 49, we provide strikers 58 which are journaled in the sides of the threshing machine casing and are extended through the outer side thereof, the foremost of the said strikers having its shaft provided with a pair of sprockets 59 and 60, as clearly shown in Fig. 1, and the chain 57 being trained around the said sprocket 59 so that motion will be imparted to the striker from the drum or shaft 52. The intermediate and rearmost strikers have their respective shafts equipped with sprockets 61 outside the threshing machine casing, and a chain 62 is trained around the sprocket 60 and the said sprockets 61 so that all the strikers will be simultaneously operated. It will be readily understood that as these strikers rotate they will be caused to impinge with some force upon the upper run of the conveyor 49 and by the consequent agitation of the said run will permit the grain to separate from the straw and fall through the spaces between the slats or cross bars of the conveyor into a casing or trough 63 which extends longitudinally of the threshing machine casing below the conveyor 49 and contains a spiral conveyor 64, by the operation of which the grain is fed toward the front end of the threshing machine. The conveyor 49 carries the straw to a point in rear of the machine and discharges it onto the ground where it may be subsequently gathered.

Upon the outer end of the shaft 10, we secure a pulley 70, and a belt 71 is trained around the said pulley and a pulley 72 on the shaft or drum 73 which supports the rear bight of the conveyor 36 and imparts motion to said conveyor. A pulley 74 is also secured upon the shaft or drum 73, and a belt 75 is trained around the said pulley 74 and a pulley 76 on the end of a short shaft 77 journaled in suitable bearings upon the front of the threshing machine casing and equipped with a beveled gear 78 which meshes with a beveled gear 79 upon the front end of the shaft of the conveyor 64, motion being thereby imparted to said conveyor 64, as will be readily understood. The conveyor 64 discharges at its front end into a similar spiral conveyor 80 which is disposed across the front end of the machine above and in rear of the conveyor 7 and is enclosed in a tubular casing 81. The shaft of the conveyor 80 extends through the left end of the casing 81 and carries a sprocket wheel 82, around which and a sprocket wheel 83 on the shaft 77 is trained a chain 84 so that the conveyor 80 will be driven from the said shaft 77.

At the right side of the tractor, we provide a cleaner, indicated as an entirety by the reference numeral 85, and supported by beams 85' projecting laterally from the tractor frame. The cleaner comprises a blower fan 86, supported by brackets or pedestals 114, and screens 87 which are so relatively arranged that the blast from the fan 86 will pass through or over the screens and will drive from the seed the chaff and other impurities which will pass out through the rear end of the casing in a well understood manner. An elevator 88 is provided to receive the seed from the rearmost or last acting screen 87 and deliver the same into a spout 89 through which the grain may pass to a wagon drawn in rear of the cleaner or caught in a receptacle carried by the lower end of the spout. The grain is delivered by the conveyor 80 into the lower end of an elevator casing 90 carried by the front end of the cleaner casing and within the said elevator casing 90 is an endless elevator 91 by which the grain is taken up and deposited onto the uppermost screen 87, as will be readily understood upon reference to Fig. 3. The shaft of the fan or blower 86 is extended through both sides of the cleaner frame and upon its inner end is secured a pulley 92 which is operatively connected by a belt 93 with a pulley 94 on the adjacent end of the main driving shaft 10. A pulley 95 is also secured upon the shaft of the blower 86 and this pulley is connected by a belt 96 with a pulley 97 upon the upper shaft 98 of the elevator 91. Upon the outer end of the shaft of the blower 86 is secured a pulley 99 connected by a belt 100 with a pulley 101 on the outer end of the upper shaft or drum 102 which actuates the elevator 88. A pulley 103 is also secured upon the outer end of the shaft of the blower 86 and this pulley 103 is connected by a belt 104 with a pulley 105 on the shaft 106 of a suction fan which will draw from the cleaner the imperfectly threshed grain and will drive it back to the threshing cylinder through a conduit 107 which rises from the casing of the said suction fan and extends across and above the tractor, as clearly shown, to enter the top of the threshing machine casing 40 immediately over the threshing cylinder 42.

A receptacle 108 is provided within the cleaner to catch small seeds separated from the grain by the screens 87.

A bell crank 109 is mounted at any convenient point of the tractor frame and connected to the frame 2 by a link 110 and any convenient means may be provided to permit manipulation of the bell crank from the operator's seat 111. By adjusting the bell crank, the cutter and the adjacent parts may be set higher or lower in an obvious manner. To guide the frame 2 in its vertical movements, we provide a slotted hanger or guide 112 secured to and depending from the cleaner and engaged by a pin or roller 113 on the said frame 2.

The pedestals 114 are provided one at each side of the cleaner and the cleaner may be rocked or tilted about the shaft of the fan 86, which is journaled in bearings on said pedestals, so that the cleaner may be kept level when traveling on an up or down grade. To effect such tilting of the cleaner, we provide a bell crank 115 on the rear portion of the tractor frame and connect it by a link 116 with the cleaner casing, suitable guiding means, indicated at 117, being provided to insure steady movement.

From the foregoing description, taken in connection with the accompanying drawings, it will be seen that we have provided a compact mechanism which may be readily mounted upon and driven by any farm tractor now in common use and by which one man will be enabled to expeditiously gather a large crop and thresh and clean the gathered grain. From the time the cutter acts upon the standing grain until the completely threshed and cleaned grain is delivered to a wagon or other receptacle by the spout 89, the operation is continuous and the grain is carried forward from one step to the next step without interruption and without requiring close attention upon the part of the operator.

Having thus described the invention, what is claimed as new is:

1. An apparatus for the purpose set forth comprising a power unit, a cutting mechanism supported across the front end of the power unit, a threshing mechanism supported upon one side of the power unit in rear of the harvesting mechanism, a cleaner supported on the opposite side of the power unit in rear of the cutting mechanism, means for delivering grain from the cutting mechanism into the threshing mechanism, means for conveying the threshed grain from the threshing mechanism to the cleaner, and means for returning some of the grain from the cleaner over the power unit to the threshing mechanism.

2. An apparatus for the purpose set forth comprising a power unit, a cutting mechanism supported across the front end of said unit, a threshing mechanism supported on one side of the power unit in rear of the cutting mechanism, a cleaner supported on the opposite side of the power unit in rear of the cutting mechanism, means for conveying material from the cutting mechanism to the threshing mechanism, means for conveying material from the threshing mechanism to the cleaner, a transverse driving shaft mounted on the front end of the power unit and extending beyond the sides of the same, and means actuated by said shaft for driving the several mechanisms.

3. In an apparatus for the purpose set forth, the combination of a power unit, a cutting mechanism supported on and across the front end of the power unit, a threshing mechanism supported on one side of the power unit in rear of the cutting mechanism, conveyors extending from the cutting mechanism to the threshing mechanism, a spiral conveyor receiving the threshed grain and feeding the same to the front end of the threshing mechanism, a spiral conveyor extending across the front end of the power unit in rear of the cutting mechanism and receiving the threshed grain from the first-mentioned spiral conveyor, and a cleaner supported on the power unit at the side thereof opposite the threshing mechanism and receiving the grain from the second spiral conveyor.

4. In an apparatus for the purpose set forth, the combination of a power unit, a cutting mechanism supported across the front end of the power unit, a threshing mechanism supported at one side of the power unit in rear of the cutting mechanism, conveyors transferring grain from the cutting mechanism to the threshing mechanism, an agitating conveyor disposed in rear of the threshing mechanism, a spiral conveyor disposed below said agitating conveyor and arranged to feed the threshed grain forwardly, a second spiral conveyor supported on and across the front end of the power unit in rear of the cutting mechanism and receiving the threshed grain from the first-mentioned spiral conveyor, an elevator receiving the grain from said second spiral conveyor, a cleaner supported on the power unit at the side opposite the threshing mechanism and receiving the grain from the last-mentioned elevator, a conduit extending transversely over the power unit and connecting the cleaner and the threshing mechanism, and means for extracting the partly cleaned grain from the cleaner and returning it through said conduit to the threshing mechanism.

5. The combination with a power unit, of a cutter carried by and across the front end of the power unit, a thresher carried by one side of the power unit, a cleaner carried by the opposite side of the power unit, conveyors connecting the cutter with the thresher and the thresher with the cleaner, and means for maintaining the cleaner in a level position.

6. The combination with a power unit, of a cutter carried by and across the front end of the power unit, a thresher carried by one side of the tractor, a cleaner carried by the opposite side of the power unit, conveyors connecting the cutter with the thresher and the thresher with the cleaner, and means mounted on the power unit for adjusting the cutter vertically.

7. An apparatus for the purpose set forth comprising a power unit, cutting, threshing and cleaning mechanism mounted thereon, and means for conveying grain transversely in front of the power unit, rearwardly on the stubbleward side thereof through the threshing mechanism, transversely in front thereof to the cleaning mechanism, and rearwardly on the grainward side thereof through the cleaning mechanism.

8. An apparatus for the purpose set forth comprising a power unit, cutting, threshing and cleaning mechanism mounted thereon, means for coveying grain transversely in front of the power unit, rearwardly on the stubbleward side thereof through the threshing mechanism, transversely in front thereof to the cleaning mechanism, and rearwardly on the grainward side thereof through the cleaning mechanism, and means for conveying grain transversely and forwardly over the power unit from the cleaning mechanism to the threshing mechanism.

9. An apparatus for the purpose set forth comprising a power unit, cutting, threshing and cleaning mechanism mounted thereon, and means for conveying grain transversely in front of the power unit rearwardly on the stubbleward side thereof through the threshing mechanism, forwardly on the same side below the threshing mechanism, transversely in front of the power unit to the cleaning mechanism and rearwardly on the grainward side thereof through the cleaning mechanism.

10. An apparatus for the purpose set forth comprising a main frame, a power unit thereon, a frame pivotally mounted on the main frame for vertical movement and extending forwardly beyond the main frame, cutting mechanism on the front end of said pivoted frame, threshing mechanism secured on the stubbleward side of the main frame, cleaning mechanism secured on the grainward side of the main frame, means on the front portion of the pivoted frame for conveying grain from the cutting mechanism to the threshing mechanism, and means on the front end of the main frame for conveying grain from the threshing mechanism to the cleaning mechanism.

In testimony whereof we affix our signatures.

EMMETT HOWARD. [L. S.]
JOSEPH W. KAYS. [L. S.]